(12) United States Patent
Kumar et al.

(10) Patent No.: US 10,290,134 B2
(45) Date of Patent: May 14, 2019

(54) COVERAGE BASED APPROACH TO IMAGE RENDERING USING OPACITY VALUES

(71) Applicant: Adobe Inc., San Jose, CA (US)

(72) Inventors: Dharmendra Kumar, Bangalore (IN); Vivek Kumar Pai, Bangalore (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/170,334

(22) Filed: Jun. 1, 2016

(65) Prior Publication Data
US 2017/0352171 A1    Dec. 7, 2017

(51) Int. Cl.
*G06T 11/60*    (2006.01)
*G06T 11/00*    (2006.01)

(52) U.S. Cl.
CPC .............. *G06T 11/60* (2013.01); *G06T 11/00* (2013.01); *G06T 11/001* (2013.01)

(58) Field of Classification Search
CPC ......... G06T 7/90; G06T 11/00; G06T 11/001; G06T 11/60; G06T 15/205; G06T 15/503; G06T 2210/62; G06T 2219/2012
USPC ...................................................... 345/592
See application file for complete search history.

(56) References Cited

U.S. PATENT DOCUMENTS

| | | | | |
|---|---|---|---|---|
| 7,483,042 B1 * | 1/2009 | Glen | ......................... | G09G 5/10 345/419 |
| 7,733,354 B1 * | 6/2010 | Mech | ..................... | G06T 15/503 345/428 |
| 2002/0196251 A1 * | 12/2002 | Duluk, Jr. | ................. | G06T 1/60 345/420 |
| 2003/0002729 A1 * | 1/2003 | Wittenbrink | .......... | G06T 15/503 382/154 |
| 2004/0183797 A1 * | 9/2004 | Kamiwada | .............. | G06T 15/40 345/419 |
| 2008/0001967 A1 * | 1/2008 | Rengarajan | .............. | G09G 5/14 345/629 |
| 2013/0135228 A1 * | 5/2013 | Won | ..................... | G06F 3/04883 345/173 |
| 2014/0085331 A1 * | 3/2014 | Davis | ..................... | G09G 5/377 345/629 |
| 2014/0119654 A1 * | 5/2014 | Taylor | ................... | G06T 7/0083 382/173 |
| 2016/0042552 A1 * | 2/2016 | McNabb | ................. | G06T 15/08 345/424 |

* cited by examiner

*Primary Examiner* — Sae Won Yoon
(74) *Attorney, Agent, or Firm* — Wolfe-SBMC

(57) ABSTRACT

A coverage based approach to image rendering using opacity values is described. In one embodiment, a digital medium environment is configured to render an image. A plurality of layers of the image are rendered in succession as following a defined depth ordering for the plurality of the layers. Effective coverage and color is determined of a plurality of objects, together, for pixels within respective ones of the plurality of layers of the image. Contribution is then controlled of the determined coverage and color of the objects to opacity values and color values in a buffer for respective pixels. This control is based on whether the opacity values indicate that the respective pixels are opaque.

20 Claims, 6 Drawing Sheets

400

402
Render a plurality of layers of the image in succession as following a defined depth ordering for the plurality of the layers

404
Determine effective coverage and color of a plurality of objects, together, for pixels within respective ones of the plurality of layers of the image

406
Control contribution of the determined coverage and color of the objects to opacity values and color values in a buffer for respective said pixels, the controlling based on whether the opacity values indicate that the respective said pixels are opaque

408
Add the determined coverage and color of the objects to opacity values and color values in a buffer for respective said pixels that are not opaque

410
Restrict contribution of the determined coverage and color of the objects to opacity values and color values in a buffer for respective said pixels that are opaque

412
Control display of the image based at least in part on the opacity values and color values for the pixels from the buffer

*Fig. 4*

COVERAGE BASED APPROACH TO IMAGE RENDERING USING OPACITY VALUES

BACKGROUND

Image layers have been developed as a way to simplify editing of the image by a user. For example, an image may be formed from a background layer, such as a forest scene, over which additional layers are "stacked" that have additional objects such as birds, kites, and so forth to render the image in a final viewable form. Because these layers are separated, one from another, changes may be made to one layer without directly interacting with another layer. Continuing with the previous example, a user may desire to change a type of bird included in the image as well as a location of the bird. To do so, the user may replace or modify the layer having the bird to replace the unwanted bird with the desired bird at a desired location. The layers may then be rendered to achieve a desired final output, e.g., the bird displayed over the forest scene.

Conventional techniques to render layers of an image, however, may exhibit unwanted "bleed through" of underlying objects. This is particularly troublesome in conventional techniques at shared edges between two objects in the image. In one conventional example, objects are rendered, one at a time, with source colors blended using multiplicative blending with the destination for each object that shares the edge. This may cause color of an underlying object to be incorporated at the intersection of the shared edges. For instance, two rectangles may include a shared edge, such as walls of a house over a background of a sky. Conventionally, the first rectangle is first rendered in relation to a background of the image. Because the first rectangle in this conventional example may not consume an entire display area of the pixel along the shared edge, however, colors of the background are blended with colors of this first rectangle to arrive at an initial color value for that pixel.

This process is then continued for the second rectangle. However, because these rectangles are rendered separately with alpha based color blending, the previous color value for the first rectangle that includes part of the background is blended with a color value for the second rectangle. This may even continue through successive layers of the image such that the background color is further incorporated upward through the layers. In this way, color values of the background may bleed "up through" the intersecting objects when rendered using this conventional technique. Thus, in this example this may result in artifacts in which a color value of the "sky" of the background bleeds through the shared edge of the walls formed by the first and second rectangles, which is unrealistic and departs from user expectations in viewing the image.

SUMMARY

A coverage based approach to image rendering using opacity values is described. In one embodiment, a digital medium environment is configured to render an image. A plurality of layers of the image are rendered in succession as following a defined depth ordering for the plurality of the layers, i.e., a top down depth ordering that follows how the objects are viewed by a user. Coverage and color is determined of a plurality of objects, together, for pixels within respective ones of the plurality of layers of the image. For example, this includes which pixels are covered by respective objects as well as a color and opacity of corresponding portions of the object.

Contribution is then controlled of the determined coverage and color of the objects to opacity values and color values in a buffer for respective pixels. To do so, the effective color contribution and the coverage at pixels having shared edges are added together, rather than using multiplicative blending with the destination for each object that shares the edge. The final coverage then defines the opacity value at the pixel. The effective color contribution and coverage at the pixels continues until the pixels are opaque. Thus, objects are permitted to contribute color and opacity values to pixels within the buffer that are not opaque and are restricted from contributing to opaque pixels. In this way, the top down depth ordering and control of contributions based on opacity of the pixels overcomes conventional bleed through problems caused by underlying objects at object intersections.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 4 is a flow diagram depicting a procedure in an example embodiment in which layers of an image are rendered to follow a depth ordering through use of a buffer.

DETAILED DESCRIPTION

Overview

Figure 1:
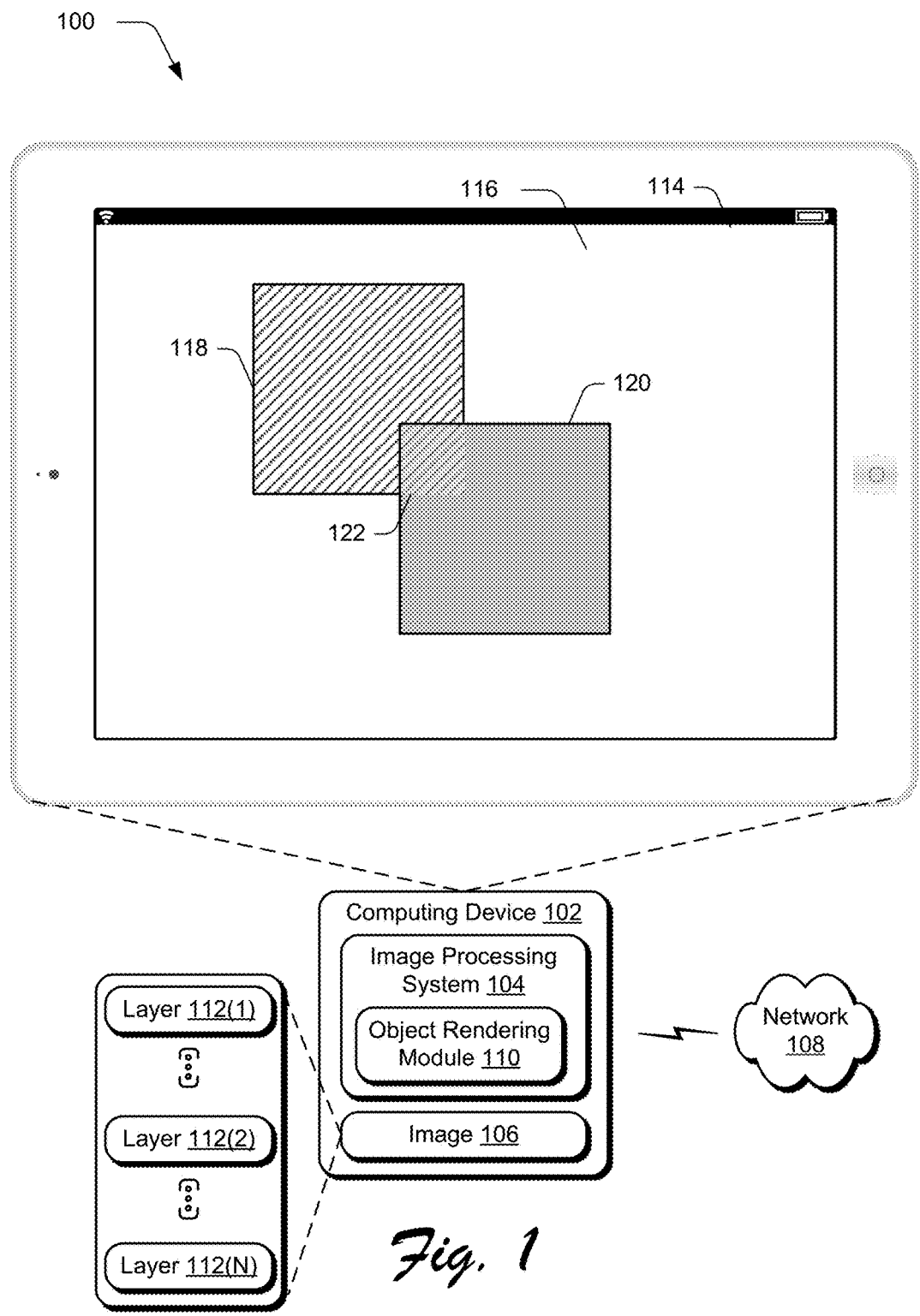
FIG. 1 is an illustration of an environment in an example embodiment that is operable to employ techniques described herein.

A coverage-based approach to image rendering is described that leverages effective coverage and opacity mapping to arrive at a color for pixels within an image. Coverage refers to objects that logically cover individual pixels, even partially, in an image and thus coverage refers to an amount (e.g., percent) of area of the pixel covered by a respective shape. Coverage is used in the following to compute color values for pixels within an image based on the objects as well as opacity values (e.g., alpha values) that describe relative amounts of underlying objects that are to be permitted to be visible "through" a corresponding object.

First and second shapes, for instance, may overlap a pixel within the image. As part of this overlap, the pixel is half-covered by the first object and half-covered by the second object, e.g., through overlapping arcs, diagonals, or other shapes of shared edges. In the techniques described herein, color and opacity values for that pixel are generated by adding contributions from these two objects. This is used to determine contributions of color to the pixel based on the coverage of these objects in relation to each other. Additive contributions avoid the limitations of conventional multiplicative blending techniques as described previously. Continuing with the previous example, for instance, both objects may exhibit a half overlap of the pixel. Thus, these objects each contribute half the color of the pixel and also together cover the entire pixel, i.e., no portion of the pixel remains that is at least partially transparent. Accordingly, these contributions are added together to arrive at a color value for that pixel, thereby addressing the effect of each object on the pixel. Also the color bleeding issue is addressed by restricting further color contributions based on an opacity value of the pixel. In other words, a pixel that is already "filled in" based on the opacity value is blocked from receiving any further color contributions from other objects in the image.

This technique may continue as part of depth ordering of the layers as part of a "top down" approach in which the layers are processed in an order of viewing in the image. In other words, the top down ordering defines an order of overlap of images through the successive layers and thus defines which portions of objects occlude viewing of portions of other objects to form a rendered version of the image. As part of progressing through these layers, contribution of objects to color values and opacity values is maintained through use of the buffer. Once opacity values for a respective pixel indicate that the pixel is opaque as described above (i.e., not translucent, transparent, or partially transparent), additional contributions to these values cease. In this way, any further underlying objects, including the background, are prevented from having an effect on the pixel and thus follows user expectations regarding realism of layering of objects in an image. Additionally, this also promotes efficiency in processing and memory resources in that contribution of additional underlying objects may be avoided that do not have an effect on the color of the pixel. Further discussion of these and other examples is included in the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ techniques described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone as illustrated), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud".

The computing device 102 is illustrated as including an image processing system 104. The image processing system 104 is implemented at least partially in hardware of the computing device 102 to process an image 106. Such processing includes creation of the image 106, modification of the image 106, and rendering of the image 106 for output. Although illustrated as implemented locally at the computing device 102, functionality of the image processing system 104 may also be implemented as whole or part via functionality available via the network 108, such as part of a web service or "in the cloud" as further described in relation to FIG. 6.

An example of functionality incorporated by the image processing system 104 to process the image 106 is illustrated as an object rendering module 110. The object rendering module 110 is implemented at least partially in hardware of the computing device 102 to render layers 112(1), 112(2), . . . , 112(N) of the image 106 for output to and display by a display device 114. As part of this rendering, the object rendering module 110 is configured to incorporate techniques to limit and even prevent "bleed through" of conventional rendering techniques.

For example, the display device 114 is illustrated as displaying a user interface that includes objects including a background 116, a first object 118, and a second object 120. Each of these objects is included in respective layers of the image 106. The background 116, for instance, may be included in layer 112(1), the first object 118 is included in layer 112(2), and the second object 120 is included in layer 112(N). The layers 112(1), 112(2), 112(N) have a defined depth ordering that specifies an order, in which, the layers are "stacked" on each other. For example, the layer 112(2) having the first object 118 is stacked on the layer 112(1) having the background 116.

Likewise, the layer 112(N) having the second object 120 is stacked on the layer 112(2) having the first object 118, which is over the layer 112(1) having the background 116. To view the image 106, a top down ordering is then achieved through this depth ordering that defines overlaps and occlusions caused by the objects. For example, portions of the second object 120 are displayed over and occlude portions of the first object 118 in this example in this top down ordering, both of which are displayed over the background 116.

As part of rendering the layers 112(1), 112(2), 112(N), the object rendering module 110 is configured to address this overlap. This may include overlap through use of a shared edge within a single layer as well as overlap between the layers. In the techniques described in the following, the object rendering module 110 is configured to determine relative contributions of the objects to color values of the pixels. This also includes addressing shared edges to prevent bleed through as is typically encountered in conventional techniques. In this way, the object rendering module 110 may prevent bleed through and promote realism, an example of which is further described in the following.

Figure 2:
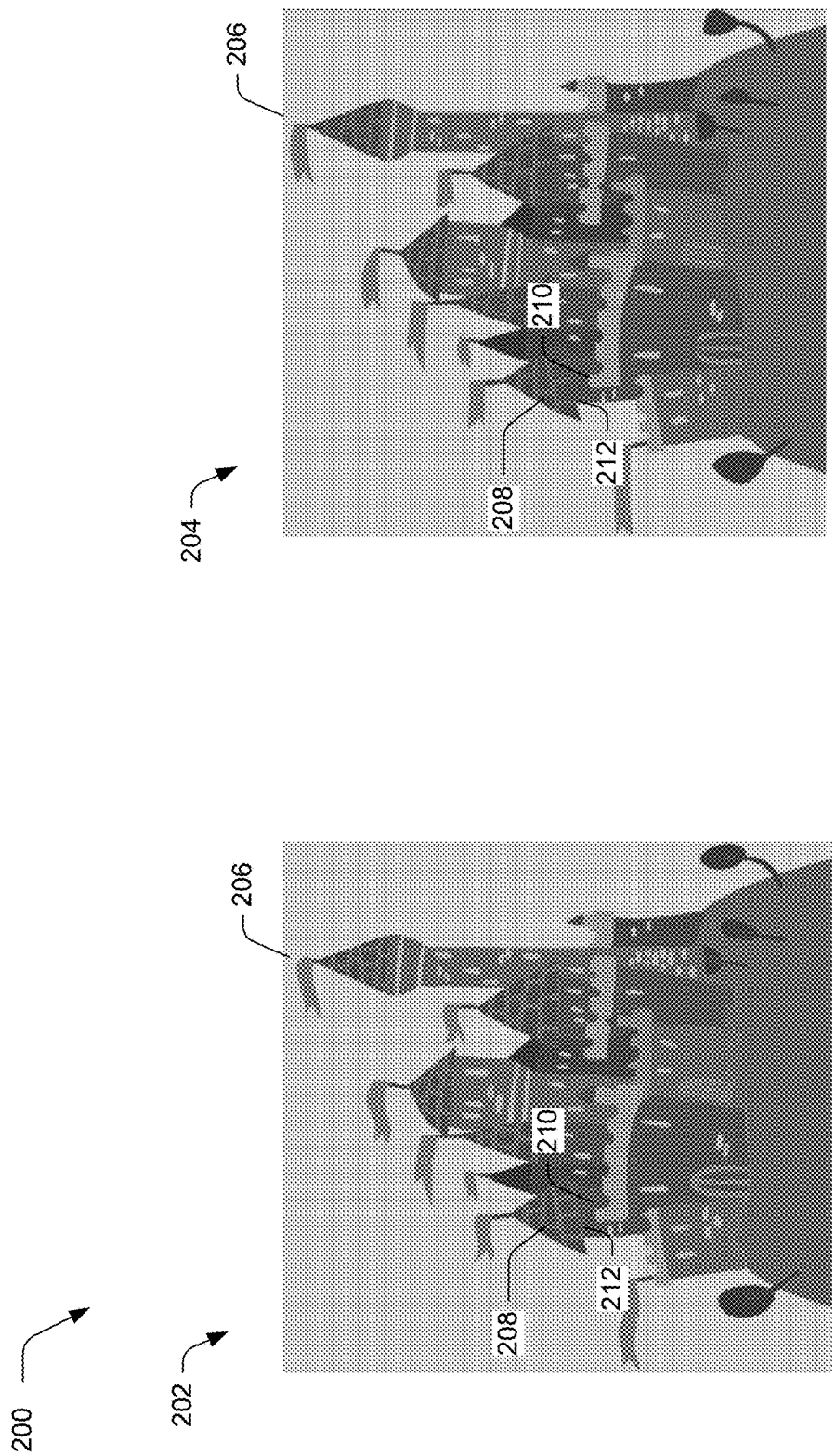
FIG. 2 depicts an example embodiment showing contrast of a conventional rendering example of an image and an example of rendering of the image using an object rendering module of FIG. 1.

FIG. 2 depicts an example implementation showing contrast of a conventional rendering example 202 (e.g., via HTML5) of an image and an example 204 of rendering of the image using the object rendering module 110 of FIG. 1. In both examples 202, 204, an image is rendered that includes objects, such as a background 206, a wall 208, and a roof 210. The objects are included in corresponding layers, such as the background 206 in layer 112(1), the wall 208 in layer 112(2), and the roof 210 in layer 112(N). Thus, this defines a top down depth ordering in which the roof 210 is displayed over the wall 208 which is displayed over the background 206.

The roof 210 and the wall 208 in this example include a shared edge 212. In the shared edge 212 of the conventional rendering example 202, a portion of the background 206 has bled through and is visible as a white line between the roof 210 and the wall 208. This is because conventional rendering techniques, as previously described in the Background, consider one object at a time and use multiplicative blending, which results into an unrealistic color value for the shared edge 212 by propagating the color of the background 206 "upward" through the layers. As illustrated in the conventional rendering example 202, this causes the background to leak through the shared edge of the wall 208 and the roof 210.

In the example 204 rendered by the object rendering system 110 of FIG. 1, however, the shared edge 212 does not exhibit this bleed through, e.g., the "white line" is gone between the roof 210 and the wall 208. This is because the object rendering system 110 is configured to determine and add coverage at a pixel from each of the objects covering the pixel partially or completely, rather than the conventional multiplicative blending rendering technique. This is further promoted through use of rendering of the layers in a top down depth ordering and use of a buffer and opacity values.

Accordingly, in the techniques described herein the colors and coverage at any pixel which is partially covered by individual shared edges is added. For the illustrated example, the wall 208 is orange and the roof 210 is brown and form a shared edge 212. When rendering the wall 208, a determination is made that the coverage is "0.5," and thus the color "0.5*orange" is added to a destination color value for the pixel, which is originally set to zero. Similarly, an alpha value for that pixel is also set as "0.5." Then, the roof 210 is rendered, and the color value of "0.5*brown" is added to the color value for the pixel and "0.5" to the alpha value for this pixel. As a result, a final result of the rendering of the pixel is a 50/50 mix of brown and orange colors with an alpha value of "1." Accordingly, this pixel is "filled in" by the contributions of the wall 208 and roof 210 and thus no other additional contributions are permitted by the computing device 102. Further discussion of this and other examples are included in the following.

Figure 3:
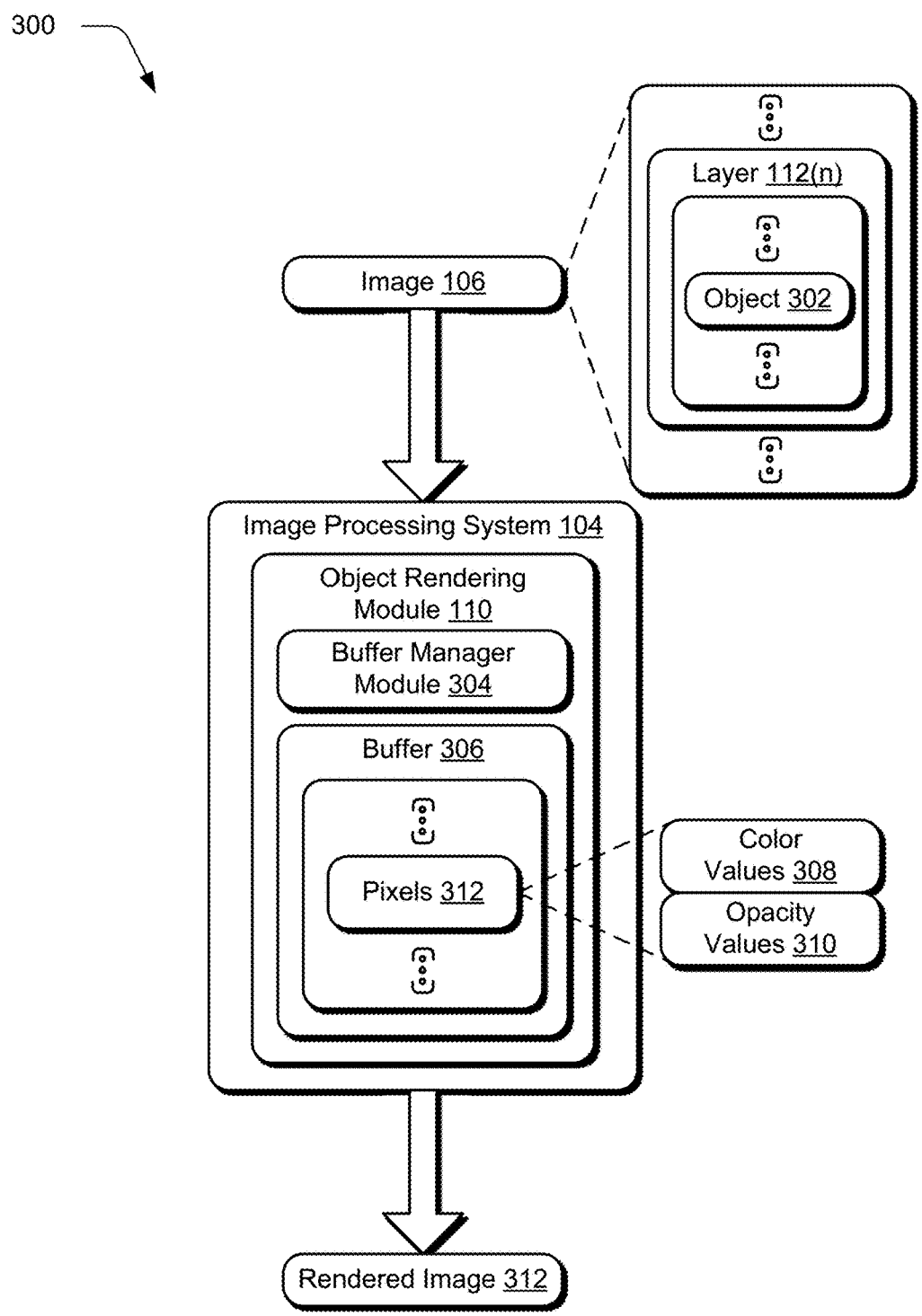
FIG. 3 depicts an embodiment of a system showing operation of the object rendering module of FIG. 1 in greater detail.

FIG. 3 depicts an embodiment of a system 300 showing operation of the object rendering module 110 of FIG. 1 in greater detail. FIG. 4 depicts a procedure 400 in an example embodiment in which layers of an image are rendered to follow a depth ordering through use of a buffer.

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference is made interchangeably to FIGS. 3 and 4.

To begin, an image 106 is received by the image processing system 104 for rendering. As previously described, the image 106 includes a plurality of layers, represented as layer 112(n), each of which include objects 302 to be rendered. The image 106 is provided by the image processing system 104 to an object rendering module 110. The object rendering module 110 is employed to render the plurality of layers of the image 106 in succession as following a defined depth ordering for the plurality of the layers (block 402). The defined depth ordering, for instance, may follow a top down depth ordering of how the layers 112(n) are stacked and viewed by a user.

As part of this rendering, effective coverage and color is determined of a plurality of objects by adding the individual contributions, for pixels within respective ones of the plurality of layers of the image (block 404). To do so, the object rendering module 110 employs a buffer manager module 304 and a buffer 306 to store color values 308 and opacity values 310 for pixels 312 of the image 106 as part of the rendering of the layers 112(n).

For example, the buffer manager module 304 first instantiates the buffer 306 in memory of the computing device 102 to include values for each of the pixels 312 to be rendered for a particular size of the image 106. The image 106, for instance, may be configured as a scalable vector graphic (SVG), in accordance with HTML5, or any other format that is scalable to a desired size having a corresponding number of pixels. The buffer 306 is then created to support color values 308 for each of these pixels, e.g., a color value for each color channel such as red, green, and blue. The buffer 306 also includes an opacity value 310, such as an alpha value that defines a relative amount of opacity of the pixel 312. Accordingly, in such an example each pixel 312 in the buffer 306 is initiated to have a value of (0, 0, 0, 0), which is black in color and an alpha value of zero.

The buffer manager module 304 then selects a first layer 112(n) of the image 106 in a top down depth ordering. Objects 302 in the selected layer are rendered, and coverage and color of the objects 302 is determined as part of this rendering. Effective color and coverage contributions are added at each pixel to get the final color and coverage. Coverage refers to which pixels 312 include at least a portion of the objects 320 being rendered and color refers to corresponding colors of the object at corresponding locations of the pixels 312.

Figure 5:
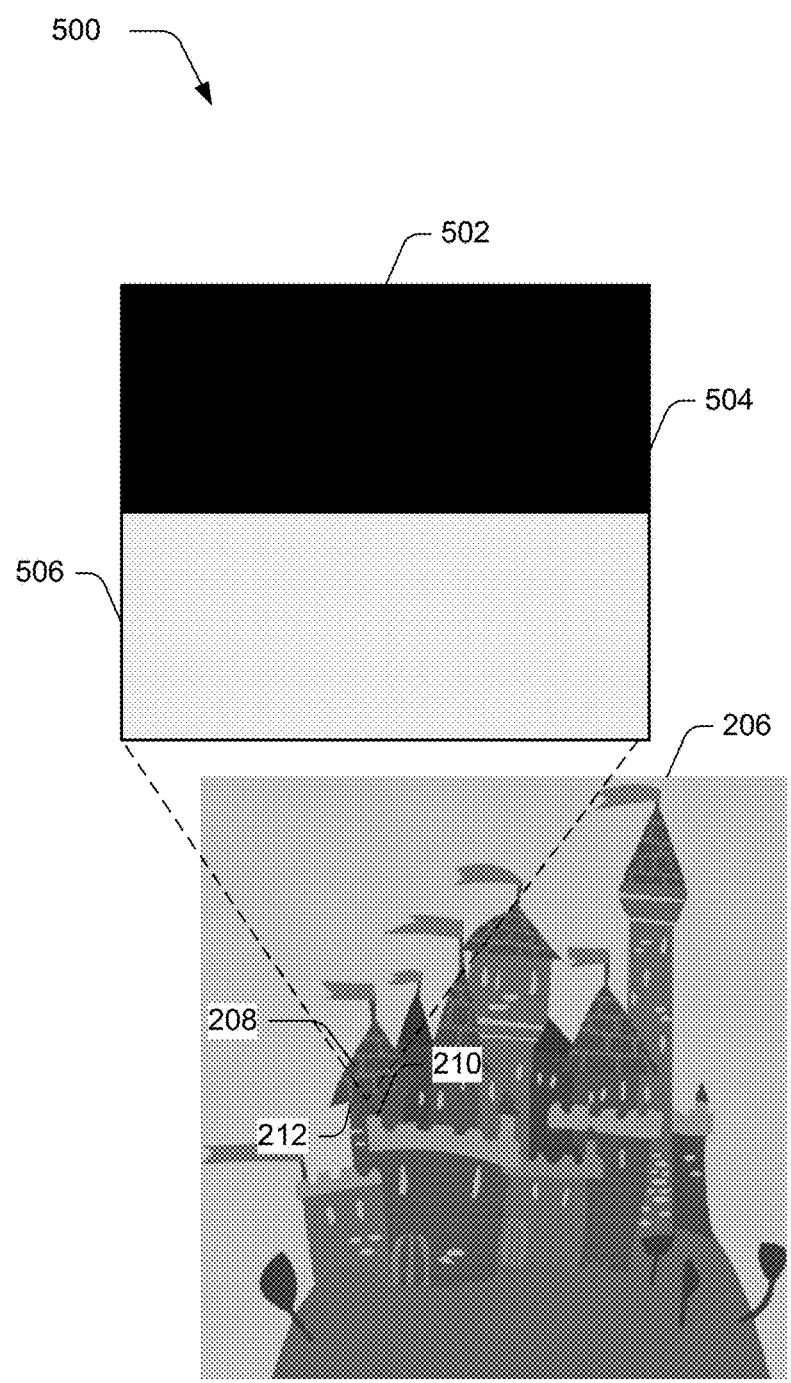
FIG. 5 depicts an example embodiment showing contribution of objects to color and opacity of a single pixel as taken from an image of FIG. 2.

Accordingly, coverage includes an amount of area of a respective pixel that is covered by a respective object. As shown in an example embodiment 500 of FIG. 5, for instance, contribution of objects to a single pixel 502 is shown as taken from an image 206 of FIG. 2. In this example, the wall 208 intersects and covers approximately half of the pixel 502. Accordingly, the pixel 502 is half covered 506 by the wall 208. Likewise, the roof 210 also intersects and covers the other half of the pixel 502 such that half of the pixel is covered 504 by the roof 210. Accordingly, coverage in this example for the pixel 502 is half defined by the wall 208 and half defined by the roof 210 as determined by the buffer manager module 204 through rendering of the objects 302 together. Such partial coverage is typically found in scalable vector graphics (SVG), HTML5, and other image formats that rely on mathematical representation of objects 302 within the image. As such, these formats are particularly susceptible to conventional bleed through of underlying layers as described in the background due to this partial coverage.

Coverage represents the amount of opacity at any pixel. Continuing with the previous example, alpha values for the wall 208 may be set to be partially translucent, i.e., have an alpha value less than one. Accordingly, this may also be taken into account by the buffer manager module 304 in the determination of coverage by the wall 208. For instance, an alpha value for the wall 208 that is half translucent and that covers one half of the area of the pixel contributes one quarter of the color for that pixel and one half of the alpha value for that pixel. In such a case, buffer manager takes care of adding the contributions from all objects in the same layer and then using the final coverage to blend the colors with the layers below.

Contribution is controlled of the determined coverage and color of the objects to opacity values and color values in a buffer for respective pixels (block 406). The buffer manager module 304 bases the control on whether the opacity values indicate that the respective said pixels are opaque. For example, the determined coverage and color of the objects is added to opacity values and color values in a buffer for respective pixels that are not opaque (block 408). On the other hand, the determined coverage and color of the objects are restricted from contributing to opacity values and color values in a buffer for respective pixels that are not opaque (block 410).

In other words, the buffer manager module 304 may continue to render the layers 112(n) in the top down depth ordering. This is used to determine the coverage and color of the objects 302 as previously described. As part of this, contributions of color and opacity from the objects 302 are added to the buffer 306 for pixels 312 that are not opaque, i.e., still have a portion that is at least partially "see through." Once opaque, however, contributions of additional objects 302 are restricted by the buffer manager module 304 from having a further effect on the pixels 312. Thus, this prevents "bleed through" by preventing underlying objects 302 from having an effect on these pixels. In an example, this may also be used to increase efficiency in operation of the buffer manager module 304 such that the coverage and colors of the objects 302 are not computed for pixels 312 that are opaque.

In one embodiment, the buffer manager module 304 employs a blend factor as part of this coverage and color determination and management of contribution of objects 302 on the pixels 312 in the buffer 306. A blend factor of "(f, f, f, 1)", for instance, may be specified for an RGBA color space with alpha values in which "f=min(sa, 1-da)." The value "sa" is an alpha value of a source (i.e., objects 302 being rendered) and "da" is an alpha value of a destination, i.e., the opacity values 310 of the buffer 306. This permits the buffer manager module 304 to stop accepting contributions from subsequent objects 302 on the buffer whenever the alpha value becomes "1" (i.e., is opaque) at any pixels since "(1-da)" is equal to "(1-1)" which is equal to zero. Accordingly, "min(sa, 1-da)=0" and thus subsequently rendered objects 302 at lower layers 112(n) in the top down depth ordering do not contribute any color to these opaque pixels 312. This follows user expectations about real world experiences in that a fully covered pixel, whether by a single object or multiple overlapping objects, does not permit further view of underlying objects.

Display is controlled of the image, based at least in part on the opacity values and color values for the pixels from the buffer (block 412). The object rendering module 110, for instance, may output a rendered image 312 from the buffer 306 for display by the display device 114 of FIG. 1. For example, the color values 308 and opacity values 310 computing collectively for the plurality of layers 112(n), once rendered to the buffer 306, are output. In this way, by rendering the layers 112(n) following a top down depth ordering and determining coverage of objects 302 within the layers together, realistic rendering results are achieved without the bleed through exhibited by conventional multiplicative blending object rendering techniques.

Example System and Device

Figure 6:
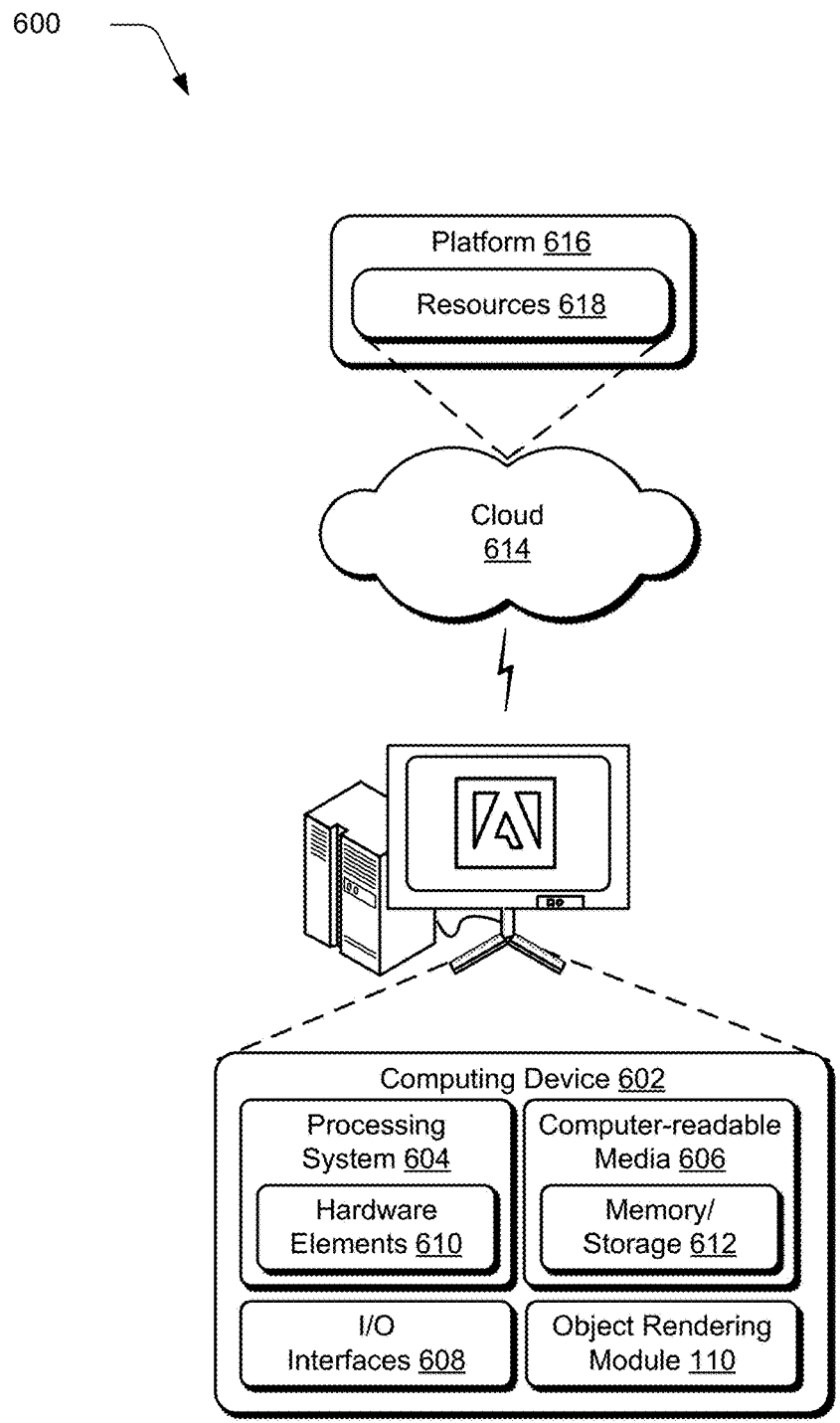
FIG. 6 illustrates an example system including various components of an example device that can be implemented as any type of computing device as described and/or utilize with reference to FIGS. 1-5 to implement embodiments of the techniques described herein.

FIG. 6 illustrates an example system generally at 600 that includes an example computing device 602 that is representative of one or more computing systems and/or devices that may implement the various techniques described herein. This is illustrated through inclusion of the object rendering module 110 of FIG. 1. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interface 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware element 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

The techniques described herein may be supported by various configurations of the computing device 602 and are not limited to the specific examples of the techniques described herein. This functionality may also be implemented all or in part through use of a distributed system, such as over a "cloud" 614 via a platform 616 as described below.

The cloud 614 includes and/or is representative of a platform 616 for resources 618. The platform 616 abstracts underlying functionality of hardware (e.g., servers) and software resources of the cloud 614. The resources 618 may include applications and/or data that can be utilized while computer processing is executed on servers that are remote from the computing device 602. Resources 618 can also include services provided over the Internet and/or through a subscriber network, such as a cellular or Wi-Fi network.

The platform 616 may abstract resources and functions to connect the computing device 602 with other computing devices. The platform 616 may also serve to abstract scaling of resources to provide a corresponding level of scale to encountered demand for the resources 618 that are implemented via the platform 616. Accordingly, in an interconnected device embodiment, implementation of functionality described herein may be distributed throughout the system 600. For example, the functionality may be implemented in part on the computing device 602 as well as via the platform 616 that abstracts the functionality of the cloud 614.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:
1. In a digital medium environment to render an image, a method implemented by at least one computing device, the method comprising:

rendering, by the at least one computing device, a plurality of layers of the image in succession to a buffer, the rendering including:
  selecting a layer of the plurality of layers based on a top down depth ordering;
  determining an opacity value of an object in the selected layer at a pixel that is partially covered by the object at a shared edge of an intersection with another object in the image;
  determining a color value of the object at the pixel at the shared edge; and
  adding an amount of the opacity value and the color value of the object to the buffer using a blend factor, the blend factor is based on an opacity value of the pixel in the buffer for said another object at the shared edge and the opacity value of the object, the blend factor restricting said adding of the opacity value and the color value of the object to the buffer when the pixel is opaque; and
controlling, by the at least one computing device, display of the image using the buffer.

2. The method as described in claim 1, wherein the determining of the opacity value is based at least in part on an amount of area of the pixel that is covered by the object.

3. The method as described in claim 1, wherein the determining of the opacity value is based at least in part on an alpha value of the object at the pixel.

4. The method as described in claim 1, wherein color values in the buffer correspond to respective ones of a plurality of color channels for a plurality of pixels.

5. The method as described in claim 1, wherein the adding of the amount of the determined opacity value and the determined color value for the pixel is performed when the pixel is not opaque.

6. The method as described in claim 1, wherein the top down depth ordering is a depth ordering for viewing of the plurality of layers.

7. The method as described in claim 1, further comprising initializing the opacity value of the pixel in the buffer to have an alpha value of zero.

8. The method as described in claim 1, further comprising initializing a color value in the buffer to be black in color.

9. In a digital medium environment to render an image, a method implemented by at least one computing device, the method comprising:
  rendering, by the at least one computing device, a plurality of layers of the image in succession, the rendering including:
    selecting a layer of the plurality of layers based on a top down depth ordering;
    determining an opacity value of an object in the selected layer at a pixel that is partially covered by the object at a shared edge of an intersection with another object in the image;
    determining a color value of the object at the pixel at the shared edge;
    determining an amount of contribution available for the object to the pixel using a blend factor that is based on an opacity value of the pixel in the buffer for the another object at the shared edge and the determined opacity value of the object; and
    adding an amount of the opacity value and the color value for the object to the opacity value and a color value in the buffer based at least in part on the amount of contribution for the object in the buffer, the adding is restricted when the amount of contribution indicates that the pixel is opaque;
  controlling, by the at least one computing device, display of the image using the buffer.

10. The method as described in claim 9, wherein the determining of the opacity value is based at least in part on an amount of area of the pixel that is covered by the object and an amount of opacity of the object.

11. The method as described in claim 9, wherein the color value is based on a color space using a plurality of color channels and the opacity value is defined as an alpha value.

12. The method as described in claim 9, wherein the adding of the amount of the determined opacity value and the determined color value is performed when the pixel is not opaque.

13. The method as described in claim 9, wherein the adding of the amount of the determined opacity value and the determined color value is performed for the plurality of layers to obtain a final color and coverage.

14. In a digital medium environment to render an image, a system comprising:
  a buffer maintained in memory of a computing device; and
  a buffer manager module implemented at least partially in hardware of the computing device to render a plurality of layers of the image in succession, the rendering including:
    selecting a layer of the plurality of layers based on a top down depth ordering;
    determining an opacity value of an object in the selected layer at a pixel that is partially covered by the object at a shared edge of an intersection with another object;
    determining a color value of the object at the pixel at the shared edge; and
    adding the determined opacity value and the determined color value to the buffer using a blend factor that is based on an opacity value of the pixel in the buffer for said another object at the shared edge and the opacity value of the object, the blend factor restricting said adding of the opacity value and color value of the object to the buffer when the pixel is opaque.

15. The system as described in claim 14, wherein the determining of the opacity value is based at least in part on an amount of area of the pixel that is covered by the object and an alpha value of the object.

16. The system as described in claim 14, wherein the buffer manager module is configured to perform the adding by determining an amount of contribution available for the object to the pixel using the blend factor.

17. The system as described in claim 16, wherein the buffer manager module is configured to perform the adding by adding an amount of the determined opacity value and an amount of the determined color value for the object to the opacity value and a color value in the buffer based at least in part on the determined amount of contribution available for the object.

18. The system as described in claim 14, wherein the buffer manager module is configured such that the adding of the amount of the determined opacity value and the determined color value is performed for the pixel when the pixel is not opaque.

19. The system as described in claim 14, wherein the buffer manager module is configured to instantiate the buffer in the memory of the computing device.

20. The system as described in claim 14, wherein the buffer manager module is configured to initialize the pixel in the buffer to be black in color and have an alpha value of zero.

* * * * *